No. 783,524.　　　　　　　　　　　　　　　　　Patented February 28, 1905.

UNITED STATES PATENT OFFICE.

GEORGE W. HOOVEN, OF ENGLEWOOD, NEW JERSEY, AND SAMUEL T. H. K. ENDEMANN, OF BROOKLYN, NEW YORK, ASSIGNORS TO CALIFORNIA PRODUCTS COMPANY, OF JERSEY CITY, NEW JERSEY.

PROCESS OF MAKING CREAM OF TARTAR.

SPECIFICATION forming part of Letters Patent No. 783,524, dated February 28, 1905.

Application filed May 17, 1901. Serial No. 60,637.

*To all whom it may concern:*

Be it known that we, GEORGE W. HOOVEN, residing at Englewood, in the county of Bergen and State of New Jersey, and SAMUEL T. H. K. ENDEMANN, residing in the borough of Brooklyn, county of Kings, city and State of New York, citizens of the United States, have invented and produced a new Process of Producing Cream of Tartar, of which the following is a specification.

This invention relates to the production of cream of tartar which as it occurs commercially is principally composed of the bitartrate of potassium; and it more especially relates to the manufacture of cream of tartar from marc or pomace, the refuse which remains after wine is expressed from grapes or other similar material.

In the accompanying specification is set forth a preferred method or carrying out this invention, the exact scope of which will be defined in the appended claims.

It has been known that the pomace or refuse from wineries contains cream of tartar, and for some time the production of cream of tartar from this pomace has been carried on in a crude way by boiling the pomace. It has been found, however, that by this method only a small part of the tartrates originally contained in the pomace were extracted, since as soon as the pomace was produced in the process of manufacturing wine fermentation at once set in and very quickly destroyed a large part of the tartrates, which were originally contained in the pomace, by reducing them to other compounds. In order to retain all of the tartrates in a condition in which they may be subsequently extracted from the pomace, it is necessary that this fermentation be prevented. The pomace, therefore, as soon as produced is thoroughly dried under a gentle artificial heat, if desired, so that fermentation is entirely prevented.

The tartrates which are contained in grape-pomace are the ordinary cream of tartar—that is to say, the bitartrate of potassium and small quantities of other soluble tartrates; but the tartrate of calcium is present in even larger quantities, and this is completely insoluble in even hot water, so that by the crude method of extracting the tartrates hitherto practiced this calcium tartrate remained insoluble and was not extracted from the pomace. By our improved process this calcium tartrate is first converted into the bitartrate of potassium, and then all the tartrates are extracted from the pomace and completely separated by solution of hot water and are thereafter separated therefrom in the usual way. This process of converting the calcium tartrate is based upon the fact that calcium tartrate is readily decomposed by oxalic acid, the products of this reaction being free tartaric acid and insoluble oxalate of calcium, which is precipitated from the solution. The free tartaric acid as it is produced in connection with the pomace unites with potassium salts which are normally present therein to form the bitartrate of potassium or cream of tartar.

The method ordinarily to be pursued in carrying out this process is as follows: A large quantity of water, from one thousand to fourteen hundred gallons, in which have been dissolved about thirty-six pounds of oxalic acid, is heated to boiling. Into this liquor one ton of dried pomace is placed and the whole stirred while the heating continues. After one hour of treatment in this liquor the liquid is drawn off and at once evaporated to separate the cream of tartar therefrom in its crystallized form. The remaining solid matter of pomace is boiled a second time for about an hour with about the same quantity of pure water, after which the liquor is drawn off and any liquor remaining in the pomace is completely extracted therefrom by either a centrifugal separator, a hydraulic press, or other convenient means. The liquor in which the pomace was boiled the second time has added to it the proper quantity of oxalic acid and is used to treat a portion of fresh pomace which is subjected to this same process.

We have spoken of the pomace as treated by this process as containing only potassium bitartrate and calcium tartrate. Other tartrates are present therein; but all of these tartrates ordinarily found in the pomace, except the calcium tartrate, are soluble, and being present in very small quantities are easily converted into cream of tartar. If the pomace is not sufficiently acid, some free acid, such as hydrochloric acid, is added to the liquor drawn off from the pomace either before or after evaporating this liquor to insure that all the normal tartrates shall be converted into potassium bitartrate.

The quantities of calcium tartrate and of available potash salts in the pomace vary, and it is necessary that the quantity of each of these elements present in any pomace which it is desired to treat by this process should be determined. The amount of oxalic acid used is varied so that there is always a very slight excess of this material present over what is necessary to entirely convert all the calcium tartrate present in the pomace and enough of a calcium salt in solution is subsequently added to precipitate all free oxalic acid or, if desired, the oxalic acid originally added may be slightly less in amount than is necessary to convert all the calcium tartrates so that in any event no free oxalic acid is present in the product. Sufficient potassium chlorid should be added to the pomace to supply any deficiency of potassium salts that there may be so that there will be enough potassium salts present in the pomace to convert all the tartaric acid set free by the oxalic-acid reaction into potassium bitartrate. The quantities which are specified have proved to be most desirable in ordinarily carrying out this process.

While this oxalic-acid process is especially adapted to the extraction of cream of tartar from grape pomace and similar material containing calcium tartrate, it is also very well adapted to the purification of commercial cream of tartar, which, as is well known, contains a considerable portion of calcium tartrate. The process to effect this result is very similar to the one just described and consists in dissolving the commercial cream of tartar in boiling water and after the addition of a sufficient quantity of oxalic acid and a potassium salt, preferably potassium chlorid, in boiling the liquor for about an hour, after which the clear liquor should be drawn off and any residue washed with hot water and filtered, while the clear liquor and filtrate should be boiled to extract the cream of tartar therefrom.

It is also possible by treatment with oxalic acid to convert calcium tartrate into any desired soluble tartrate by boiling the calcium tartrate with oxalic acid in the presence of a salt containing the base which it is desired should unite with the tartaric acid. The resulting liquor is thereafter filtered off and the desired tartrate separated therefrom by any usual method, such as evaporation.

We do not wish to be limited to the exact amounts of the ingredients which we employ in this process or the exact treatment to which we subject the material, since the ordinary person skilled in this art could readily vary the amounts of the various ingredients employed and also the steps of the process to a considerable extent without departing from the essential principles which underlie this process. It is also manifest that certain steps of this improved process could be employed without carrying out the complete process.

The exact scope of our invention will therefore be pointed out in the appended claims.

We claim—

1. The process of producing cream of tartar from pomace which consists in drying the pomace to prevent destructive fermentation, then in treating the pomace with a solution of oxalic acid in hot water and in drawing off and evaporating the resulting liquor.

2. The process of producing cream of tartar from pomace which consists in treating the pomace with a dilute solution of oxalic acid, in drawing off the liquor and evaporating the same and treating the pomace a second time with hot water, and entirely separating the resulting liquor from the exhausted pomace and in subsequently extracting the cream of tartar from said liquor.

3. The continuous process of producing cream of tartar from pomace which consists in subjecting each charge of pomace to a treatment with hot water in which oxalic acid has been dissolved, in drawing off and evaporating the resulting liquor to separate the cream of tartar, in subjecting each charge of pomace to a second treatment with hot water, in completely separating the resulting liquor from the exhausted pomace and in dissolving oxalic acid in said liquor for the treatment of the next succeeding charge of pomace.

4. The continuous process of producing cream of tartar from pomace which consists in subjecting each charge of about a ton of pomace to the action of a boiling solution of about thirty-six pounds of oxalic acid in twelve hundred gallons of water, in separating and evaporating the resulting liquor to produce the cream of tartar, in subjecting each charge of pomace to a second treatment with hot water, in completely separating the resulting liquor from the exhausted pomace and in dissolving about thirty-six pounds of oxalic acid therein for the treatment of the succeeding charge of pomace.

5. The process of producing cream of tartar from pomace which consists in treating the pomace in a hot solution of oxalic acid, in the presence of a potassium salt.

6. The process of producing cream of tartar from pomace which consists in adding to the pomace a quantity of potassium salt to secure the presence of additional potassium therein and in treating the said pomace with a hot solution of oxalic acid to reduce the tartrate of calcium contained in said pomace to potassium bitartrate in separating the resultant liquor from the pomace and in evaporating the same.

7. The method of converting calcium tartrate into potassium bitartrate which consists in boiling the calcium tartrate in a solution of oxalic acid in the presence of potassium salts, in separating the clear liquor and in separating the potassium bitartrate therefrom.

8. The process of producing potassium bitartrate from calcium tartrate which consists in subjecting the calcium tartrate to the action of oxalic acid in the presence of potassium salts.

9. The method of reducing calcium tartrate which consists in subjecting the calcium tartrate to the action of oxalic acid in the presence of suitable salts, the bases of which unite with the tartaric acid produced to form tartrates.

10. The process of producing cream of tartar from pomace which consists in treating substantially a ton of pomace with a heated solution of about thirty-six pounds of oxalic acid in twelve hundred gallons of water and in separating and evaporating the resulting liquor to produce cream of tartar.

GEORGE W. HOOVEN.
SAMUEL T. H. K. ENDEMANN.

Witnesses:
JOHN N. MOORE,
HARRY L. DUNCAN.